(12) United States Patent
Meyer et al.

(10) Patent No.: US 12,032,172 B2
(45) Date of Patent: Jul. 9, 2024

(54) RETAINING DEVICE FOR AN OPTICAL MODULE HAVING AT LEAST ONE SPRING ELEMENT

(71) Applicant: Excelitas Noblelight GmbH, Hanau (DE)

(72) Inventors: Stefan Meyer, Hanau (DE); Friedrich Merz, Hanau (DE)

(73) Assignee: Excelitas Noblelight GmbH, Hanau (DE)

( * ) Notice: Subject to any disclaimer, the term of this patent is extended or adjusted under 35 U.S.C. 154(b) by 0 days.

(21) Appl. No.: 17/615,451

(22) PCT Filed: Jun. 25, 2020

(86) PCT No.: PCT/EP2020/067881
§ 371 (c)(1),
(2) Date: Nov. 30, 2021

(87) PCT Pub. No.: WO2020/260484
PCT Pub. Date: Dec. 30, 2020

(65) Prior Publication Data
US 2022/0228729 A1    Jul. 21, 2022

(30) Foreign Application Priority Data

Jun. 27, 2019 (DE) .......................... 102019209358.2

(51) Int. Cl.
*G02B 27/09* (2006.01)
*B41J 11/00* (2006.01)
*F21V 17/16* (2006.01)

(52) U.S. Cl.
CPC ......... *G02B 27/09* (2013.01); *B41J 11/00214* (2021.01); *B41J 11/00216* (2021.01); *B41J 11/00218* (2021.01); *F21V 17/164* (2013.01)

(58) Field of Classification Search
CPC ................. G02B 27/09; B41J 11/00216; B41J 11/00218; B41J 11/00214; F21V 17/164; F21V 17/00; F21V 17/10; F21V 17/16
See application file for complete search history.

(56) References Cited

U.S. PATENT DOCUMENTS

| | | | |
|---|---|---|---|
| 2003/0075692 A1 | 4/2003 | Ullrich et al. | |
| 2005/0001896 A1* | 1/2005 | Wakisaka | G02B 6/4204 347/241 |
| 2012/0162976 A1* | 6/2012 | Claeys | B41F 23/0409 29/525.08 |

(Continued)

FOREIGN PATENT DOCUMENTS

| | | |
|---|---|---|
| CN | 108426202 A | 8/2018 |
| DE | 4313073 A1 | 10/1994 |

(Continued)

OTHER PUBLICATIONS

International Search Report and Written Opinion dated Oct. 26, 2020 by the European Patent Office for counterpart international patent application No. PCT/EP2020/067881 (with machine English translation attached).

(Continued)

*Primary Examiner* — Bao Q Truong
(74) *Attorney, Agent, or Firm* — Wolf, Greenfield & Sacks, P.C.

(57) ABSTRACT

The present invention relates to a retention apparatus comprising
a) a retention body, which delimits an inner region at least on a first side and a further side opposite to the first side, and
b) at least one spring element;
wherein the retention body comprises, on the first side, a first receiving portion facing the inner region and, on the further side, a second receiving portion facing the inner region; wherein the retention apparatus is embodied to retain at least one optical module, which has a light input side and an opposing light output side, by means of the first receiving portion, the second receiving portion, and the at least one spring element in a retention state,
in such a way that the at least one optical module in the retention state is retained
  a. in a first direction extending from the light input side to the light output side by means of an interlock of
    i. the at least one optical module with the first receiving portion and (Continued)

ii. the at least one optical module with the second receiving portion, and b. in the opposite direction to the first direction by means of a spring force of the at least one spring element directed against the at least one optical module.

Further, the invention relates to a luminaire having the retention apparatus according to the invention; a printing machine having the luminaire according to the invention; a production method using the luminaire according to the invention; and uses of the retention apparatus according to the invention; and of the luminaire.

19 Claims, 11 Drawing Sheets

(56) References Cited

U.S. PATENT DOCUMENTS

| | | | |
|---|---|---|---|
| 2017/0009961 A1* | 1/2017 | Wertz | H01L 33/648 |
| 2018/0202714 A1 | 7/2018 | Meyer et al. | |

FOREIGN PATENT DOCUMENTS

| | | |
|---|---|---|
| DE | 20117228 U1 | 1/2002 |
| DE | 102008033743 A1 | 4/2010 |
| DE | 212012000195 U1 | 7/2014 |
| DE | 202015100151 U1 | 4/2016 |
| DE | 112017003548 T5 | 3/2019 |
| EP | 2113714 A1 | 11/2009 |
| JP | 2003103828 A | 4/2003 |
| JP | 2010058880 A | 3/2010 |
| WO | 2013/164054 A1 | 11/2013 |
| WO | 2017/062894 A1 | 4/2017 |

OTHER PUBLICATIONS

Herbst, W. and Hunger, K., "Industrial Organic Pigments: Production, Properties, Applications" Third, Completely Revised Edition, Wiley-VCH Verlag Gmbh & Co. KGaA published 2004; ISBN: 3-527-30576-9 (672 pages).

English translation of Dec. 28, 2021 International Preliminary Report on Patentability Opinion for counterpart International patent application No. PCT/EP2020/067881 dated Jan. 6, 2022 by the International Bureau of WIPO.

Office Action dated Feb. 14, 2023 in CN Application No. 202080046920.

Office Action dated Oct. 4, 2022 in JP Patent Application No. 2021-577174.

* cited by examiner 105, 106

600

600

900

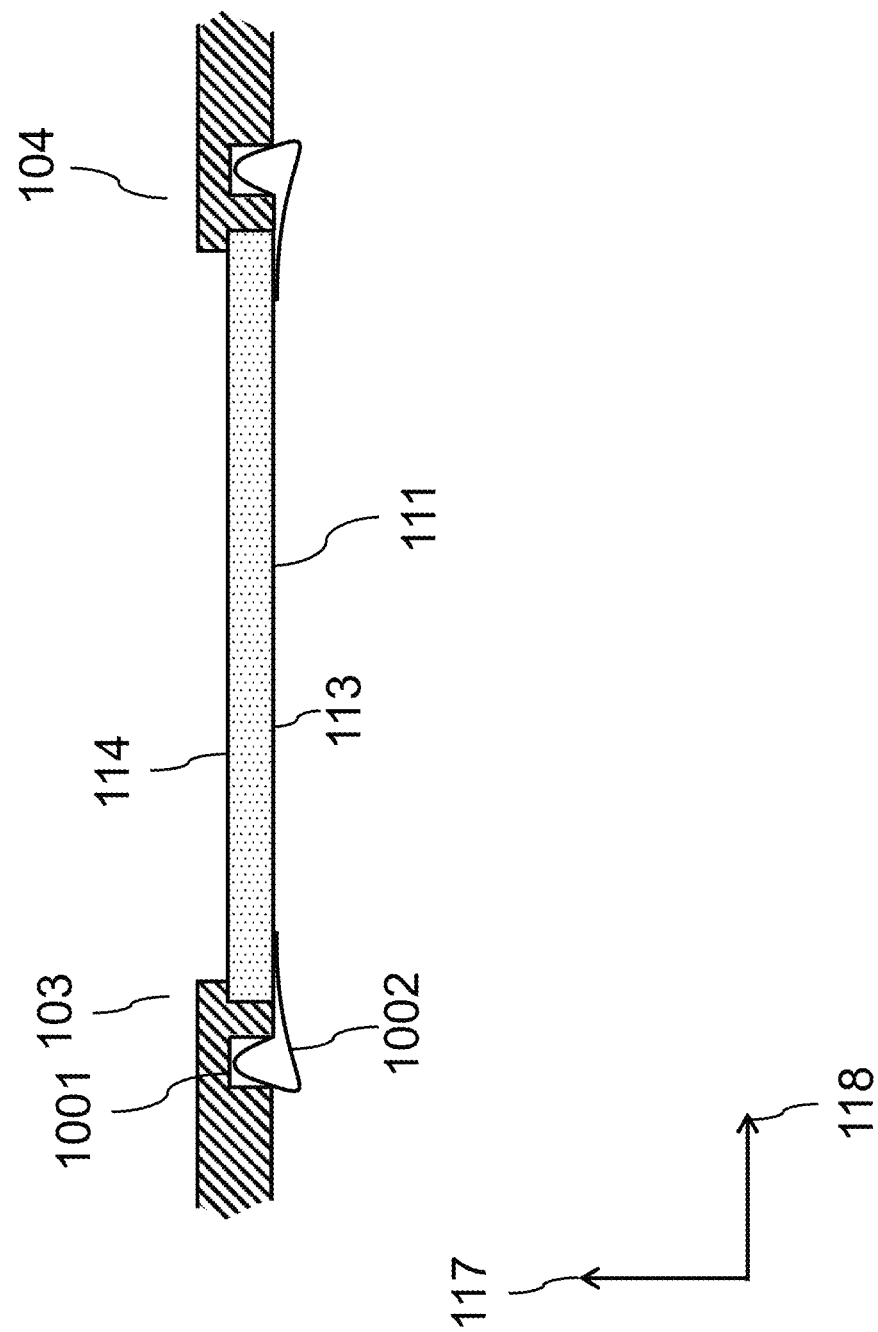

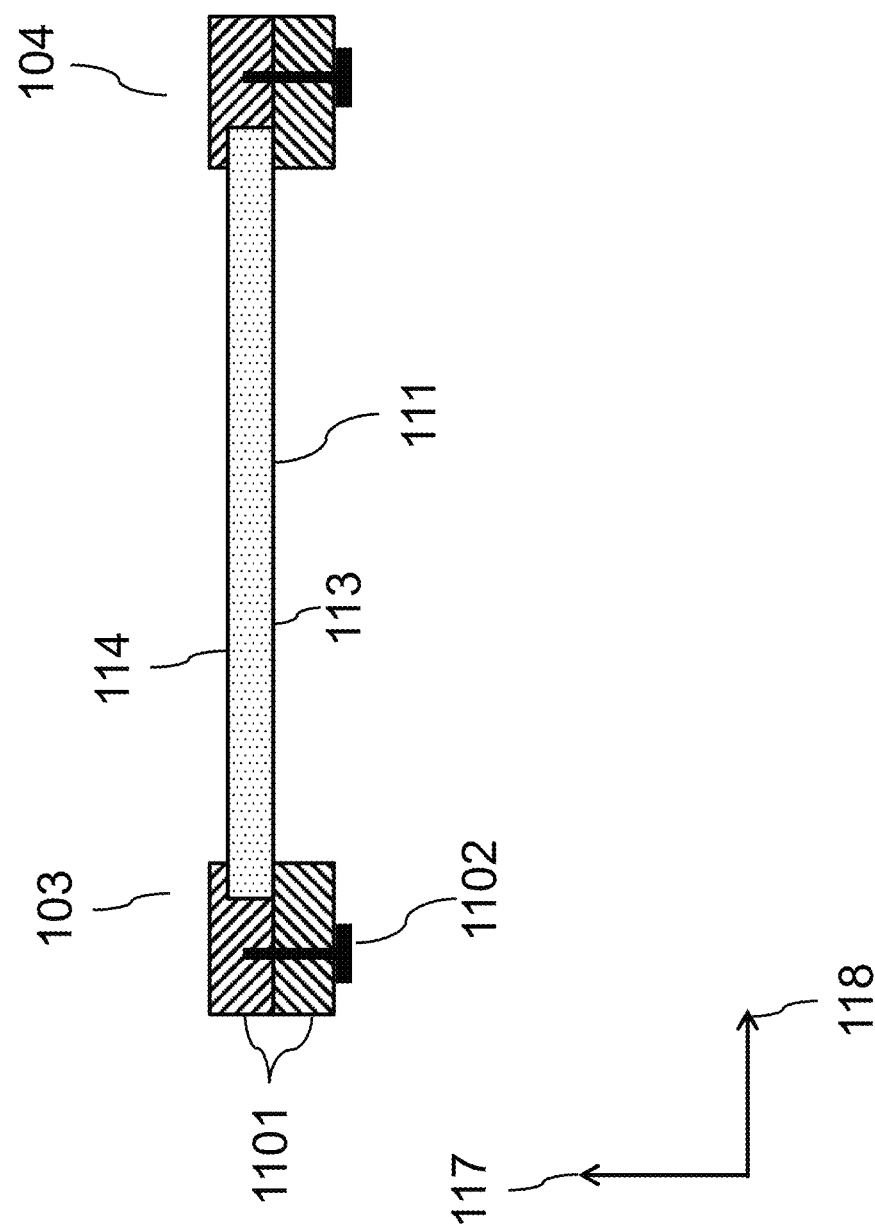

RETAINING DEVICE FOR AN OPTICAL MODULE HAVING AT LEAST ONE SPRING ELEMENT

CROSS-REFERENCE TO RELATED APPLICATIONS

This application is a National Stage filing under 35 U.S.C. § 371 of International Application Serial No. PCT/EP2020/067881, filed Jun. 25, 2020, which claims the benefit of priority to DE application number 102019209358.2, filed Jun. 27, 2019, each of which is herein incorporated by reference in its entirety.

The present invention relates to a retention apparatus comprising
  a) a retention body, which delimits an inner region at least on a first side and a further side opposite to the first side, and
  b) at least one spring element;
wherein the retention body comprises, on the first side, a first receiving portion facing the inner region and, on the further side, a second receiving portion facing the inner region; wherein the retention apparatus is embodied to retain at least one optical module, which has a light input side and an opposing light output side, by means of the first receiving portion, the second receiving portion, and the at least one spring element in a retention state, in such a way that the at least one optical module in the retention state is retained
    a. in a first direction extending from the light input side to the light output side by means of an interlock of
      i. the at least one optical module with the first receiving portion and
      ii. the at least one optical module with the second receiving portion, and
    b. in the opposite direction to the first direction by means of a spring force of the at least one spring element directed against the at least one optical module.

Further, the invention relates to a luminaire having the retention apparatus according to the invention; a printing machine having the luminaire according to the invention; a production method using the luminaire according to the invention; and uses of the retention apparatus according to the invention; and of the luminaire.

In the technical field of the invention—the printing industry—the industrial use of luminaires for curing printing inks and varnishes has been known for a long time. Further, the use of UV-curable inks and varnishes—i.e., inks and varnishes which can be cured by irradiation with suitable ultraviolet radiation—is known. Conventionally, mercury vapor lamps are used to cure such inks and varnishes. However, these luminaires have significant disadvantages, for example in respect of service life, maintenance intensity and also heat development. This was already identified in the prior art. As a consequence, light-emitting semiconductor components, in particular light-emitting diode modules (LED modules), are used ever more frequently in place of mercury vapor lamps for the purposes of irradiating UV-curable inks and varnishes. Even though the use of light-emitting diodes already opens up many advantages over the conventional mercury vapor lamps, there is room for improvement in terms of the configuration of the luminaires with LEDs, in particular but not exclusively with UV LEDs. Thus, to obtain sufficiently large irradiated surfaces, luminaires for industrial applications must comprise a multiplicity of LEDs. In this case, use is frequently made of chip-on-board LEDs with a multiplicity of light-providing semiconductor chips on one printed circuit board. The light emitted by the semiconductor chips must now be modified by means of optical units in such a way that a desired spatial intensity profile is obtained, where possible without steps and stripes. In addition to the primary optical units seated directly on the semiconductor chips, secondary optical units that are spaced apart from the semiconductor chips are frequently also used to this end. These are often combined in planar optical modules. These optical modules must now be securely retained at a defined distance within the luminaire. A suitable retention apparatus is required to this end. FIG. 11 shows a retention apparatus known from the prior art; it has at least the disadvantages discussed in the description of the figure.

It is an overall object of the present invention to at least partially overcome a drawback arising from the prior art.

A further object of the invention consists in providing a retention apparatus which allows an optical module to be retained as securely as possible within a luminaire, at a defined distance from a light source of the luminaire.

According to a further object of the invention, the preceding retention apparatus moreover facilitates a replacement of individual optical modules of the luminaire that is as simple as possible, preferably possible without tools. A further object of the invention is to provide one of the aforementioned retention apparatuses, which further facilitates retaining and replacing an optical module with a reduced risk of damage to the optical module and/or other elements of the luminaire. According to a further object of the invention, one of the preceding retention apparatuses moreover facilitates a spatial intensity profile of the luminaire that is as homogeneous as possible. According to a further object of the invention, one of the preceding retention apparatuses moreover allows the replacement of the optical module purely from the user side of the luminaire. A further object of the invention is to provide one of the aforementioned retention apparatuses, which is further distinguished by reduced spatial requirements, preferably in the radiation direction and/or transversely thereto. According to a further object of the invention, one of the preceding retention apparatuses moreover makes do without retaining plastics components, which fatigue in the work surroundings of the luminaires and can thus lead to errors. According to a further object of the invention, one of the preceding retention apparatuses moreover facilitates the most simple and/or fastest possible manufacture of the luminaire, in the housing of which the retention apparatus is integrated. A further object of the invention is that of providing one of the aforementioned retention apparatuses, which is further suitable for retrofitting an existing luminaire.

Further, it is an object of the invention to provide a luminaire and/or printing machine that profits from the advantages of one of the preceding retention apparatuses. A further object of the invention is to provide a printing machine for large-area printing that is as homogeneous as possible. Further, it is an object of the invention to provide a printing machine that is as convenient as possible from a servicing point of view.

A contribution to the at least partial achievement of at least one of the aforementioned objects, preferably of a plurality of the aforementioned objects, is made by the independent claims. The dependent claims provide preferred embodiments that contribute to the at least partial achievement of at least one of these objects.

A contribution to achieving at least one of the objects according to the invention is provided by an embodiment 1 of a retention apparatus, which comprises a) a retention body, which delimits an inner region at least on a first side and a further side opposite to the first side, and b) at least one spring element;

wherein the retention body comprises, on the first side, a first receiving portion facing the inner region and, on the further side, a second receiving portion facing the inner region; wherein the retention apparatus is embodied to retain at least one optical module, which has a light input side and an opposing light output side, by means of the first receiving portion, the second receiving portion, and the at least one spring element in a retention state, in such a way that the at least one optical module in the retention state is retained a. in a first direction extending from the light input side to the light output side by means of an interlock of
  i. the at least one optical module with the first receiving portion and
  ii. the at least one optical module with the second receiving portion, and
b. in the opposite direction to the first direction by means of a spring force of the at least one spring element directed against the at least one optical module. A preferred retention apparatus is a retention apparatus for retaining the at least one optical module in a luminaire.

In a preferred embodiment 2, the retention apparatus according to the invention is configured according to its embodiment 1, wherein the at least one optical module in the retention state is further retained c. in a second direction extending from the first side to the further side by means of an interlock between the at least one optical module and the second receiving portion, and
d. in the opposite direction to the second direction by means of an interlock between the at least one optical module and the first receiving portion.

In a preferred embodiment 3, the retention apparatus according to the invention is configured according to its embodiment 1 or 2, wherein the first receiving portion is a first groove and the second receiving portion is a second groove in the retention body. Preferably, the first groove or the second groove or both extends in a third direction that is perpendicular to the first direction or to the second direction or to both.

In a preferred embodiment 4, the retention apparatus according to the invention is configured according to any one of its preceding embodiments, wherein the retention body comprises at least one further receiving portion, wherein the at least one spring element is received in the at least one further receiving portion in the retention state.

In a preferred embodiment 5, the retention apparatus according to the invention is configured according to any one of its preceding embodiments, wherein the at least one further receiving portion is at least one further groove in the retention body. Preferably, the at least one further groove extends in the third direction that is perpendicular to the first direction or to the second direction or to both.

In a preferred embodiment 6, the retention apparatus according to the invention is configured according to any one of its embodiments 1 to 3, wherein the retention apparatus comprises a first spring element and a further spring element, wherein the at least one optical module in the retention state is retained on the first side counter to the first direction by means of a spring force of the first spring element directed against the at least one optical module and is retained on the further side counter to the first direction by means of a spring force of the further spring element directed against the at least one optical module.

In a preferred embodiment 7, the retention apparatus according to the invention is configured according to its embodiment 6, wherein the retention body comprises a third receiving portion and a fourth receiving portion, wherein the first spring element is received in the third receiving portion in the retention state, wherein the further spring element is received in the fourth receiving portion in the retention state.

In a preferred embodiment 8, the retention apparatus according to the invention is configured according to its embodiment 7, wherein the third receiving portion is a third groove in the retention body and the fourth receiving portion is a fourth groove in the retention body. Preferably, the third groove or the fourth groove or both extends in the third direction that is perpendicular to the first direction or to the second direction or to both. Preferably, the first and the second groove, or the third and the fourth groove, or the first to the fourth groove extend in the same groove direction.

In a preferred embodiment 9, the retention apparatus according to the invention is configured according to any one of its preceding embodiments, wherein the first receiving portion comprises a retention region and an assembly region, wherein a depth of the first receiving portion in the assembly region is greater than in the retention region. The depth preferably extends counter to the second direction.

In a preferred embodiment 10, the retention apparatus according to the invention is configured according to its embodiment 9, wherein the first receiving portion, the second receiving portion and the at least one spring element are embodied and arranged in such a way that the optical module is able to be transferred from the retention state into an assembly state by moving the optical module on the first side counter the spring force of the at least one spring element and transferring said optical module from the retention region into the assembly region of the first receiving portion, wherein the optical module is able to be removed from the retention apparatus in the assembly state.

In a preferred embodiment 11, the retention apparatus according to the invention is configured according to any one of its preceding embodiments, wherein the at least one spring element in the retention state is tensioned counter to the first direction and in a third a direction perpendicular thereto. Preferably, the third direction is also perpendicular to the second direction.

In a preferred embodiment 12, the retention apparatus according to the invention is configured according to any one of its preceding embodiments, wherein the at least one spring element is at least one bending spring.

In a preferred embodiment 13, the retention apparatus according to the invention is configured according to its embodiment 12, wherein the at least one bending spring is elongated, wherein the at least one bending spring comprises a first section, a second section, and a third section in this sequence along its longitudinal extent, wherein the at least one bending spring comprises a first bend in a first bending direction in the first section, a second bend in a further bending direction, counter to the first bending direction, in the second section, and a third bend in the first bending direction in the third section. If the shape of the at least one bending spring along the longitudinal extent is described here by a mathematical function of a variable, a graph of this mathematical function comprises a local minimum in the first section, a local maximum in the second section, and a further local minimum in the third section, provided the first direction points upward in relation to the graph. The second section is preferably located between two points of inflections of the graph. Preferably, the graph respectively has a global maximum at a first end of the bending spring, or at a further end opposite to the first end, or at both ends.

In a preferred embodiment 14, the retention apparatus according to the invention is configured according to its embodiment 12 or 13, wherein a first end and a further end, opposite thereto, of the at least one bending spring are embodied in the retention state to retain the optical module in a third direction, which is perpendicular to the second direction, and counter to said third direction. Preferably, the third direction is also perpendicular to the first direction. Preferably, the first end or the further end or both have a straight embodiment.

In a preferred embodiment 15, the retention apparatus according to the invention is configured according to any one of its embodiments 12 to 14, wherein the at least one bending spring is a wire spring or a leaf spring.

In a preferred embodiment 16, the retention apparatus according to the invention is configured according to any one of its preceding embodiments, wherein the optical module comprises at least one optical unit, preferably a multiplicity of optical units.

In a preferred embodiment 17, the retention apparatus according to the invention is configured according to its embodiment 16, wherein the at least one optical unit is a secondary optical unit. Preferably, the optical units of the multiplicity of optical units comprise secondary optical units. More preferably, the optical units of the multiplicity of optical units are secondary optical units.

In a preferred embodiment 18, the retention apparatus according to the invention is configured according to its embodiment 16 or 17, wherein the at least one optical unit is a lens. Preferably, the optical units of the multiplicity of optical units comprise lenses. More preferably, the optical units of the multiplicity of optical units are lenses.

In a preferred embodiment 19, the retention apparatus according to the invention is configured according to any one of its preceding embodiments, wherein the optical module, preferably the at least one optical unit, more preferably the optical units of the multiplicity of optical units, comprises glass or silicone or both, preferably consists thereof. A preferred glass is quartz glass or borosilicate glass. In one embodiment, the optical module comprises a glass layer and a silicone layer as layers that are superimposed on one another, preferably in the first direction. Preferably the optical module consists of the aforementioned layers.

In a preferred embodiment 20, the retention apparatus according to the invention is configured according to any one of its preceding embodiments, wherein the retention body additionally comprises at least one additional receiving portion for retaining an optical window, wherein the at least one additional receiving portion is arranged and embodied in such a way that the optical window retained by means of the at least one additional receiving portion is arranged downstream of the optical module in the first direction in the retention state. Preferably, the at least one additional receiving portion is at least one additional groove in the retention body. Preferably, the retention body comprises a first additional receiving portion on the first side and a second additional receiving portion on the further side. An optical window is a planar optical element which is embodied to modify light transmitted through the optical window as little as possible. To this end, entry and exit faces of the optical window preferably have a plane parallel embodiment. Consequently, the optical window should be distinguished from the at least one optical module. The optical window often serves as protection against external influences such as dust, for example. In a preferred embodiment, the retention apparatus comprises the optical window retained by means of the at least one additional receiving portion.

In a preferred embodiment 21, the retention apparatus according to the invention is configured according to any one of its preceding embodiments, wherein the retention body comprises a structural profile, preferably is a structural profile. A structural profile is frequently also referred to as hollow chamber profile or assembly profile. The structural profile is an elongate semifinished product, which preferably, but not necessarily, consists of metal. In this case, aluminum is a preferred metal. Preferably, the structural profile is obtainable by means of an extrusion method.

In a preferred embodiment 22, the retention apparatus according to the invention is configured according to any one of its preceding embodiments, wherein the retention body is embodied to connect to a housing of a luminaire. A preferred connection is implemented by means of at least one fastening means, preferably by means of at least one screw, or by inserting, preferably sliding, the retention body into the housing of the luminaire. In this embodiment, the retention apparatus is particularly suitable for retrofitting an existing luminaire.

In a preferred embodiment 23, the retention apparatus according to the invention is configured according to any one of its embodiments 1 to 21, wherein the retention body is embodied in one piece with a housing of a luminaire.

In a preferred embodiment 24, the retention apparatus according to the invention is configured according to any one of its preceding embodiments, wherein the retention apparatus comprises the optical module, preferably in the retention state.

In a preferred embodiment 25, the retention apparatus according to the invention is configured according to any one of its preceding embodiments, wherein the retention apparatus comprises a multiplicity of the optical modules, respectively in the retention state. Preferably, the optical modules are arranged in succession in the third direction.

A contribution to achieving at least one of the objects according to the invention is provided by an embodiment 1 of a luminaire, which comprises
A) at least one light source and
B) the retention apparatus 1 according to the invention as per any one of its embodiments 1 to 23 and
C) the at least one optical module in the retention state, wherein the at least one optical module is arranged downstream of the at least one light source in the first direction.

In a preferred embodiment 2, the luminaire according to the invention is configured according to its embodiment 1, wherein the at least one optical module is spaced apart from the at least one light source in the first direction.

In a preferred embodiment 3, the luminaire according to the invention is configured according to its embodiment 1 or 2, wherein the at least one light source is a light-emitting semiconductor component. A light-emitting diode (LED) is a preferred light-emitting semiconductor component. A UV LED or an IR LED is a preferred LED.

In a preferred embodiment 4, the luminaire according to the invention is configured according to any one of its embodiments 1 to 3, wherein the luminaire is a UV emitter or an IR emitter.

A contribution to achieving at least one of the objects according to the invention is provided by an embodiment 1 of a printing machine, comprising the luminaire according to the invention as per any one of its embodiments.

In a preferred embodiment 2, the printing machine according to the invention is configured according to its embodiment 1, wherein the printing machine is an offset printing machine, preferably a sheet-fed offset printing machine.

A contribution to achieving at least one of the objects according to the invention is provided by an embodiment 1 of a method for producing a product, the method comprising the following as method steps:

a) providing
   i) the luminaire according to the invention as per any one of its embodiments and
   ii) an object to be irradiated; and
b) irradiating the object to be irradiated with light emitted by the at least one light source, the product being obtained thereby.

In a preferred embodiment, the method comprises prior to step b) superimposing a composition on a substrate and irradiating the composition as object to be irradiated in step b). A print substrate is a preferred substrate. When superimposing the latter, the composition is preferably liquid. The superimposing is preferably implemented as printing. In a preferred embodiment, the composition when superimposing comprises at least one colorant, preferably in a proportion in a range from 0.5 to 20 wt %, more preferably from 1 to 15 wt %, more preferably from 2 to 10 wt %, most preferably from 3 to 8 wt %, in each case based on the composition when superimposing. In a further preferred embodiment, the composition when superimposing comprises a vehicle, preferably in a proportion in a range from 10 to 95 wt %, more preferably from 20 to 95 wt %, more preferably from 30 to 95 wt %, most preferably from 40 to 90 wt %, in each case based on the composition when superimposing. In a further preferred embodiment, the composition when superimposing comprises a photoinitiator, preferably in a proportion in a range from 1 to 30 wt %, more preferably from 2 to 25 wt %, more preferably from 3 to 20 wt %, most preferably from 5 to 15 wt %, in each case based on the composition when superimposing. In a further preferred embodiment, the composition when superimposing comprises at least one monomer, preferably in a proportion in a range from 10 to 95 wt %, more preferably from 20 to 95 wt %, more preferably from 30 to 90 wt %, more preferably from 40 to 85 wt %, more preferably from 50 to 85 wt %, most preferably from 60 to 80 wt %, in each case based on the composition when superimposing. In a further preferred embodiment, the composition when superimposing comprises at least one monomer, at least one oligomer, preferably in a proportion in a range from 1 to 50 wt %, preferably from 1 to 40 wt %, more preferably from 2 to 30 wt %, more preferably from 3 to 25 wt %, most preferably from 5 to 20 wt %, in each case based on the composition when superimposing. In a further preferred embodiment, obtaining the product comprises curing of the composition. The curing preferably comprises a reduction in a proportion of a vehicle in the composition. As an alternative or in addition thereto, the curing preferably comprises a polymerization of a monomer or of an oligomer or of both in the composition. A particularly preferred composition is a printing ink or a varnish or both. In a preferred embodiment, the method is a method for producing a printed product. A preferred printed product is one selected from the group consisting of a periodical, a book, a poster, an advertisement, a label, or a combination of at least two thereof. In one embodiment of the method according to the invention, the printing machine according to the invention as per any one of its embodiments is provided in method step a).

A contribution to achieving at least one of the objects according to the invention is provided by an embodiment 1 of a use 1 of the retention apparatus according to the invention as per any one of its embodiments 1 to 23 for retaining a secondary optical unit of a UV emitter or of an IR emitter as the at least one optical module.

A contribution to achieving at least one of the objects according to the invention is provided by an embodiment 1 of a use 2 of the retention apparatus according to the invention as per any one of its embodiments 1 to 23 for connecting a luminaire to the at least one optical module. In this case, a preferred connection is implemented within the scope of retrofitting the luminaire with the at least one optical module.

A contribution to achieving at least one of the objects according to the invention is provided by an embodiment 1 of a use 3 of the luminaire according to the invention as per any one of its embodiments for curing a composition.

A contribution to achieving at least one of the objects according to the invention is provided by an embodiment 1 of a use 4 of the luminaire according to the invention as per any one of its embodiments in a printing machine. A preferred printing machine is configured like the printing machine according to the invention as per any one of its embodiments. Further, the luminaire in the printing machine is preferably used to cure a composition. Curing is preferably implemented as per one embodiment of the method according to the invention.

Features described as preferred in one category according to the invention, for example according to the retention apparatus of the invention, are likewise preferred in an embodiment of the further categories according to the invention, for example an embodiment of the luminaire according to the invention, the printing machine, the method or the uses 1 to 4.

Receiving Portion

Provided nothing else is specified, the following explanations apply to the first to fourth, to the further and to the additional receiving portion in conjunction with the invention. In principle, any receiving portion that appears suitable to a person skilled in the art for the respective purpose comes into question as a receiving portion. In this case, a receiving portion is an element which partly receives another element for the at least partial spatial fixation of the latter. In this case, the phrase partial fixation means that the other element is restricted in respect of movements in at least one spatial direction or that such movements are entirely prevented. In this case, the at least partial fixation is implemented by means of an interlock between the receiving portion and the other element. A preferred receiving portion comprises a depression for at least partly receiving, preferably for partly receiving, the element to be retained, the at least one optical module, the at least one spring element or the optical window in this case. The receiving portion is preferably embodied as a depression. A groove is a preferred depression. A groove is an elongate depression. Grooves are often, but not necessarily, introduced by cutting, in particular by means of a milling machine. In principle, a cross section of the groove can have any shape appearing to be suitable, for example a rectangular shape. The second groove or the further groove or both preferably has a rectangular cross section. The first groove preferably does not have a rectangular cross section. This applies, in particular, since the first groove preferably comprises the retention region and the assembly region. A cross section of a groove is preferably substantially constant along a length of the groove.

Optical Module

In conjunction with the retention apparatus according to the invention, any optical module appearing suitable to a person skilled in the art comes into question. In this case, the at least one optical module is embodied and, in the retention state, arranged to optically modify light emitted by a light source, which impinges on the at least one optical module at the light input side, on its path to the light output side, preferably to modify a propagation of this light. A preferred modification of the propagation of the light is one selected from the group consisting of focusing, scattering, and collimating. To this end, the at least one optical module comprises an optical unit. Herein, an optical unit is an element which, when used as intended, is embodied and arranged to manipulate electromagnetic radiation, i.e. light. In this case, both optical component parts and optical components come into question. A preferred optical unit is one selected from the group consisting of a transmission optical unit, a conversion optical unit, and a reflection optical unit, or a combination of at least two thereof. A transmission optical unit is an optical unit which is traversed by electromagnetic radiation for the purposes of manipulating the latter. A preferred transmission optical unit is a lens or a transmission grating. A conversion optical unit is an optical unit arranged and embodied to alter a wavelength of electromagnetic radiation. In the case of an LED as a light source, said conversion optical unit can preferably serve to adjust a color of the light emitted by the LED. A preferred conversion optical unit is a conversion layer, i.e. a layer comprising at least one fluorescent dye. A reflection optical unit is an optical unit which reflects electromagnetic radiation for the purposes of manipulating the electromagnetic radiation, in particular a propagation direction of the latter. A preferred reflection optical unit is a mirror or a reflection grating. The optical module preferably comprises a multiplicity of optical units. In conjunction with the optical module, transmission optical units, in particular lenses, are particularly preferred. The at least one optical module preferably extends in planar fashion in a module plane. In this case, the optical module extends preferably at least 10 times as far in each direction of the module plane than in the direction of the thickness of the optical module, which is perpendicular to the module plane. Preferably, an optical axis of the at least one optical unit of the optical module is perpendicular to the module plane. Preferably, the second direction or the third direction or both lies in the module plane. In conjunction with the optical module, a secondary optical unit is particularly preferred as optical unit. In this case, a secondary optical unit should be distinguished from a primary optical unit. A primary optical unit is an optical unit which is seated directly and preferably not in a non-destructively detachable manner on a light source. When used as intended, a secondary optical unit is arranged at a distance from the associated light source in an emission direction of the light source. In this case, the secondary optical unit is preferably arranged in reversible fashion. This means that the light source and secondary optical unit can be separated from one another in non-destructive fashion. Thus, the secondary optical unit can preferably be replaced while the light source remains the same. The optical module itself preferably comprises no light source. The first and the second receiving portions and the at least one spring element are preferably arranged and embodied to retain the at least one optical module in a luminaire at a distance from a light source of the luminaire in the retention state.

Spring Element

In principle, any spring element appearing suitable to a person skilled in the art comes into question as a spring element of the retention apparatus according to the invention. In this case, a bending spring is preferred and a wire spring is particularly preferred. The spring force of the at least one spring element is a force arising from an elastic deformation of the at least one spring element, said force being directed against the direction of the elastic deformation.

Retention Body

In principle, any retention body appearing suitable to a person skilled in the art for retaining an optical module by means of the first and second receiving portion and at least one spring element comes into question as a retention body of the retention apparatus according to the invention. The retention body is preferably elongate in a longitudinal direction. The longitudinal direction is preferably perpendicular to the first direction, further preferably additionally perpendicular to the second direction. The longitudinal direction preferably is the third direction. In the longitudinal direction, the retention body preferably has a length in a range from 100 to 3000 mm, more preferably from 200 to 3000 mm, more preferably from 300 to 3000 mm, even more preferably from 400 to 3000 mm, most preferably from 400 to 2000 mm. The retention body is further preferably embodied in one piece. The retention body is preferably obtainable in one piece by extrusion and optional subsequent subtractive processing steps, such as drilling for example. In a respective embodiment of the retention apparatus and of the luminaire according to the invention, the retention body is embodied as a housing of a luminaire, as a housing of the luminaire in the case of the luminaire. In this case, a housing is a component of the luminaire which receives the remaining components of the luminaire and which substantially, i.e. apart from possible windows, openings, and connections, forms an external surface of the light source, which protects interior components from ambient influences such as dust and mechanical influences. The retention body preferably comprises an electrically conductive material; preferably it consists thereof. In this case, a metal is a preferred electrically conductive material. A preferred metal is one selected from the group consisting of aluminum, copper, gold, nickel, and steel, or combination of at least two thereof. Preferably the retention body consists of aluminum.

Luminaire

A luminaire is an apparatus which, in addition to a light source, comprises further elements for operation of the light source as intended or comprises necessary elements for the intended use of the light emitted by the light source. By way of example, these elements can include one or more secondary optical units, a cooling system, electronic elements, and a housing. Within the scope of the invention, any apparatus which appears suitable to a person skilled in the art for the use according to the invention, preferably for the use in a printing machine, comes into question as a luminaire. Preferably the luminaire according to the invention is an emitter, preferably for use in an industrial process, particularly preferably for use in an industrial printing method. A preferred emitter is an ultraviolet emitter (UV emitter) or an infrared emitter (IR emitter). UV emitters and IR emitters and modules comprising one or more such emitters are used in numerous industrial processes. By way of example, this includes drying and curing of coatings, shaping, embossing, laminating, joining, welding, browning, heating, heating up, and preheating, and also germ reduction. In this case, a preferred industrial process is a continuous method. The explanations given above in respect of processes and methods in each case also apply to the method according to the invention in a preferred embodiment. The luminaire according to the invention preferably comprises a ballast, which is arranged and embodied to operate the light source, particularly in the case of an LED module as a light source. A preferred ballast is an electronic ballast. A preferred electronic ballast is an LED driver. Further preferably, the luminaire according to the invention comprises means for cooling the light source, in particular a cooling structure such as for example cooling fins, and/or cooling channels for supplying and removing a cooling fluid, in particular a cooling liquid.

Light Source

In principle, any element for emitting electromagnetic radiation comes into question as a light source in this case. The light source of the luminaire according to the invention is the element of the luminaire which is arranged and embodied to emit electromagnetic radiation with a defined spectrum. To this end, the light source preferably comprises an emission medium which emits the electromagnetic radiation. A preferred emission medium is a solid or a gas or both. A preferred gas is a noble gas or a metal vapor or both. A preferred solid is a filament or a semiconductor or both. In the case of a semiconductor as an emission medium, the light source is also referred to as light-emitting semiconductor component herein.

A preferred light source is a light-emitting semiconductor component. Any component comprising a semiconductor which appears suitable to a person skilled in the art as a light-emitting component of the light source according to the invention comes into question as a light-emitting semiconductor component in this case. The light-emitting semiconductor components include, in particular, light-emitting diodes (LEDs) and laser diodes (also referred to as semiconductor lasers), with light-emitting diodes being particularly preferred in this case.

A particularly preferred LED is an IR LED (infrared LED) or a UV LED (ultraviolet LED) or both. A preferred UV LED is one selected from the group consisting of a UV-A LED, a UV-B LED, and a UV-C LED, or a combination of at least two thereof. An IR LED is an LED arranged and embodied to emit light with a spectrum comprising a peak wavelength in an IR wavelength range. A UV LED is an LED arranged and embodied to emit light with a spectrum comprising a peak wavelength in a UV wavelength range. A preferred UV wavelength range is one selected from the group consisting of a UV-A wavelength range, a UV-B wavelength range, and a UV-C wavelength range, or a combination of at least two thereof.

In addition to a semiconductor chip as an emission medium, a preferred light-emitting semiconductor component preferably additionally comprises at least one optical unit, often a primary optical unit, which is superimposed on the at least one semiconductor chip in an emission direction. In the case of an LED as a light-emitting semiconductor component, the preceding setup, comprising a substrate carrying the semiconductor chip, the semiconductor chip itself and, optionally, one or more optical units, is often also referred to as a package in the technical field. Package and LED are often used synonymously. In the case of the chip-on-board technology, which also comes into question within the scope of the invention, a plurality of semiconductor chips are arranged on a common substrate. Thus, the package comprises a plurality of semiconductor chips in this case. In general, a package can comprise further elements such as electrical contacts, protection circuits and elements for heat dissipation.

Electromagnetic Radiation

Herein, the term electromagnetic radiation is used synonymously with the term light. In addition to visible light, both also comprise components of the electromagnetic spectrum that are not visible to the human eye. Preferred electromagnetic radiation lies in the wavelength range from 10 nm to 1 mm. Further preferred electromagnetic radiation is infrared radiation (IR radiation) or ultraviolet radiation (UV radiation) or a mixture of both. According to the DIN 5031-7 standard, the wavelength range of UV radiation extends from 10 to 380 nm. According to the definition, UV-A radiation lies in the range from 315 to 380 nm, UV-B radiation lies in the range from 280 to 315 nm, UV-C radiation lies in the range from 100 to 280 nm, and EUV radiation lies in the range from 10 to 121 nm. Within the scope of the invention, UV radiation, selected from the group consisting of UV-A radiation, UV-B radiation, and UV-C radiation, or combination of at least two thereof, is particularly preferred. It should be noted in this case that the aforementioned standard defines the wavelength ranges of UV radiation but that, in the technical field of LEDs which, as described below, represent a preferred light source within the scope of the invention, LEDs with maxima of the emitted intensity (also referred to as peak wavelength in the technical field) in the case of wavelengths that do not lie in the wavelength range as specified in the standard are referred to as UV LEDs. By way of example, LEDs with maxima of the emitted intensity at wavelengths of 385 nm, 395 nm and 405 nm are also referred to as UV-A LEDs. Within the scope of the invention, such LEDs also belong to the light-emitting semiconductor components which are preferred as light sources. Further, the terminology of the technical field is adopted here and such LEDs are also referred to as UV LEDs.

Printing Machine

Any type of printing machine suitable for the use of the luminaire according to the invention comes into question as a printing machine according to the invention. A preferred printing machine is embodied to carry out the method according to the invention as per any one of its embodiments. Preferably, the luminaire is arranged and embodied in the printing machine to irradiate a composition printed onto a printing substrate. The composition is preferably a printing ink or a varnish or both. A preferred printing machine is a printing machine without a print image storage means. A preferred printing machine without a print image storage means is embodied for non-impact printing (NIP). A preferred printing machine without a print image storage means is an inkjet printer or a laser printer or both. An alternative preferred printing machine comprises a print image storage means. A preferred print image storage means is a print roller or print plate. Further, a preferred printing machine is arranged and embodied for indirect printing by means of the print image storage means. A preferred printing machine for indirect printing is an offset printing machine. A preferred offset printing machine is a sheet-fed offset printing machine.

To Object to be Irradiated

In principle, any object that can be modified to obtain the product by way of irradiation with light from the luminaire comes into question as an object to be irradiated. In this case, the process of irradiating itself can trigger or facilitate the modification. In this case the modification can be a modification selected from the group consisting of a physical modification, a chemical modification, and a biological modification, or a combination of at least two thereof. A preferred physical modification comprises a physical modification selected from the group consisted of a deformation, joining, an adjustment of a surface tension, and an evaporation, or combination of at least two thereof. A preferred deformation is deep-drawing or embossing or both. A preferred joining is welding or laminating or both. A preferred chemical modification comprises a chemical reaction. A preferred chemical reaction is a polymerization reaction or cross-linking reaction or both. A preferred biological modification comprises a reduction in the number of germs by way of irradiation with electromagnetic radiation. Preferably, the object to be irradiated comprises a, preferably planar, substrate and a composition. In a preferred configuration, the, preferably planar, substrate comprises the composition. In a further preferred configuration, the composition is superimposed on the substrate, at least in part on a side of the substrate facing the luminaire. The composition preferably comprises a liquid; more preferably, the composition is a liquid. The liquid preferably comprises a solvent or an initiator for a chemical reaction or both. More preferably, the liquid is a solvent or an initiator for a chemical reaction or both. In the case of a solvent, the luminaire is preferably embodied to at least partly evaporate the solvent by way of irradiating the object to be irradiated with the light, particularly preferably said luminaire is configured in respect of the output radiant flux or the emission spectrum of the light or both. Water or an organic solvent or both are a preferred solvent. In the case of an initiator for a chemical reaction, the luminaire is preferably embodied to initiate the chemical reaction by way of irradiating the object to be irradiated with the light, particularly preferably said luminaire is configured in respect of the output radiant flux or the emission spectrum of the light or both. A preferred planar substrate comprises a fibrous material such as paper, paperboard, cardboard, for example, or a nonwoven, for example for sanitary articles such as diapers or sanitary towels. The substrate particular preferably consists of the fibrous material. A further preferred planar substrate is a film, preferably a polymer film, or a laminate comprising a plurality of layers, for example polymer layers. A preferred composition is selected from the group consisting of a printing ink, an ink, and a varnish, or combination of at least two thereof. A preferred ink is a dispersion ink. In a configuration according to the invention, the object to be irradiated is a printing substrate printed with a printing ink. In a further configuration according to the invention, the object to be irradiated is a water-comprising object such as a nonwoven, which can be dried by irradiation with the light. In a further configuration according to the invention, the object to be irradiated is a protective-varnish-coated substrate, wherein the protective paint can be cured by irradiation with the light. In a further configuration according to the invention, the object to be irradiated is a blank which can be made at least partly deformable by way of the irradiation with the light such that the blank can be processed into a shaped body for example by deep-drawing or can be embossed.

One Piece

An element has a one-piece embodiment if it was manufactured in one piece, preferably from a shapeless material, without subsequent joining of various constituent parts. Accordingly, the element preferably comprises no joint, such as for example a seam, a welded joint, a soldered joint or adhesively bonded joint. Accordingly, subtractive manufacturing steps in the production are not an obstacle to the one piece property of the element.

Superimposing

If an element, for example a layer or a component, is defined herein as to be superimposed on another element, these elements can directly follow one another, i.e. without an interspersed further element, or indirectly follow one another, i.e. with at least one interspersed further element. Elements directly following one another preferably adjoin one another, i.e. they are in contact with one another. Further, elements superimposed on one another are preferably connected to one another. Elements superimposed on one another can be indirectly or directly connected to one another. Two elements are connected to one another if their adherence to one another exceeds the attractive van der Waals forces. Elements connected to one another are preferably selected from the group consisting of elements soldered to one another, welded to one another, sintered to one another, screwed to one another, and adhesively bonded to one another, or combination of at least two thereof. A phrasing where a layer sequence comprises listed layers or coatings means that at least the specified layers or coatings are present in the sequence specified. This phrasing does not necessarily state that these layers or coatings follow one another directly. Phrasing in which two layers adjoin one another states that these two layers follow one another directly and consequently without an intermediate layer. If one layer is superimposed on another layer in a layer sequence, the layer is not necessarily superimposed on the other layer over the entire area of the one or the other layer, but preferably over a planar region of the two layers. The layers forming the layer sequence of the planar composite are preferably connected to one another in planar fashion.

Curing

In this case, curing a composition is a solidification of the composition, with a layer which is preferably also connected to the underlying substrate during the curing being obtained from the composition. The layer can be a contiguous layer, which is preferred in the case of a varnish as a composition, or a non-contiguous layer, for example in the form of letters formed from a printing ink. Preferred curing is physical curing or chemical curing or both. Drying is a preferred form of physical curing. Drying preferably comprises a reduction in the proportion of the vehicle in the composition, preferably to 0 wt %, preferably by evaporating the vehicle. A preferred vehicle is an organic vehicle or an inorganic vehicle. Water is preferred as an inorganic vehicle. A further preferred vehicle is a solvent. Chemical curing comprises a chemical reaction. A preferred chemical reaction is a polymerization reaction or a cross-linking reaction or both. If the composition is a powdery composition, curing comprises a connection of particles of the powdery composition, thereby obtaining a contiguous solid, which is preferably moreover connected to the underlying substrate. In the case of a liquid composition, the latter transitions from the liquid phase to the solid phase during curing.

Printing Substrate

Any object appearing suitable to a person skilled in the art within the scope of the invention comes into question as a printing substrate, which is also referred to as printing material. A preferred printing substrate has a planar embodiment. This means that a length and a width of the printing substrate are greater than the thickness of the printing substrate by a factor of at least 10, more preferably at least 100, even more preferably at least 1000. A preferred planar printing substrate has a web-shaped embodiment. This means that a length of the printing substrate is greater than a width of the printing substrate by a factor of at least 2, more preferably at least 5, even more preferably at least 10, most preferably at least 100. A preferred printing substrate comprises, preferably consists of, paper, a film, or a laminate. A preferred laminate comprises one or more polymer layers, one or more paper layers, one or more metal layers, or a combination of the aforementioned layers in a layer sequence.

Printing Ink

Printing inks are colorant-containing mixtures which have a suitable viscosity for application as a thin layer. In this case, the thin layer in the cured state preferably has a thickness (dry thickness) in a range from 0.5 to 50 μm, preferably 1 to 30 μm, more preferably 1 to 20 μm. A preferred printing ink comprises one selected from the group consisting of one or more colorants, a binder, a vehicle, and an additive, or a combination of at least two, preferably all, of the aforementioned. In this case, a preferred binder is a resin or a polymer or a mixture of both. A preferred vehicle is a solvent. A preferred additive serves to set a desired property of the printing ink, preferably a desired processing property, for example a viscosity of the printing ink. A preferred additive is one selected from the group consisting of a dispersing additive, a defoamer, a wax, a lubricant, and a substrate wetting agent, or combination of at least two thereof. Further, a preferred printing ink is one selected from the group consisting of a toner, ink for an inkjet printer, offset printing ink, illustration printing ink, liquid ink, and a radiation-curing printing ink, or combination of at least two thereof. A preferred offset printing ink is a web-fed offset printing ink or a sheet-fed offset printing ink or both. A preferred web-fed offset printing ink is a web-fed coldset offset printing ink or a web-fed heatset offset printing ink or both. A preferred liquid ink is a water-based liquid ink or a solvent-based liquid ink or both. A particularly preferred printing ink comprises 8 to 15 wt % of least one colorant, preferably at least one pigment, and a total of 25 to 40 wt % of at least one resin or at least one polymer or a mixture of the two, 30 to 45 wt % of at least one high-boiling mineral oil (boiling range 250 to 210° C.), and a total of 2 to 8 wt % of at least one additive, in each case related to the weight of the printing ink.

Varnish

A varnish is a liquid or else a powdery coating substance which has a suitable viscosity for an application as a thin layer and from which a solid, preferably contiguous, film is obtainable by curing. Varnishes often comprise at least one of the group consisting of at least one binder, at least one filler, at least one vehicle, at least one colorant, at least one resin and/or at least one acrylate, and at least one additive, or a combination of at least two therefrom, with a combination of all the aforementioned constituents (with resin and/or acrylate) being preferred. In this case, a biocide is a preferred additive. An in-can preservative is a preferred biocide. Varnishes often serve to protect the object coated therewith, to decorate, to functionalize a surface of the object, for example changing electrical properties or resistance against wear, or combination of the aforementioned functions. A varnish preferred within the scope of the invention is one selected from the group consisting of a water-based varnish, a solvent-based varnish, a UV-based varnish, i.e. a UV curable varnish, and a dispersion varnish, or combination of at least two thereof. A particularly preferred varnish is embodied to protect a printed surface.

Colorant

Both solid and liquid colorants which are known to a person skilled in the art and suitable for the present invention come into consideration as a colorant. Pursuant to DIN 55943:2001-10, colorant is the collective term for all coloring substances, in particular for dyes and pigments. A preferred colorant is a pigment. A preferred pigment is an organic pigment. Pigments that are notable in connection with the invention are especially the pigments mentioned in DIN 55943:2001-10 and those mentioned in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9). A pigment is a colorant that is preferably insoluble in the application medium. A dye is a colorant that is preferably soluble in the application medium.

Method Steps

In a method described herein, the method steps of a step sequence are implemented in the specified sequence of their order symbols. In this case, the steps of the step sequence can follow one another indirectly or directly. Further, successive method steps can be implemented successively in time, with a time overlap, or else simultaneously.

Measurement Processes

The measurement process set forth below was used within the scope of the invention. Unless stated otherwise, the measurements were carried out at an ambient temperature of 23° C., an ambient pressure of 100 kPa (0.986 atm) and a relative humidity of 50%.

The invention will now be described hereinbelow with reference to examples and drawings, without the examples and drawings signifying any restriction of the invention. Unless stated otherwise in the description or in relation to the respective figure, the drawings are schematic and not true to scale.

FIG. 10 shows a schematic cross-sectional illustration of a non-inventive retention apparatus; and FIG. 11 shows a schematic cross-sectional illustration of a further non-inventive retention apparatus.

Figure 1:
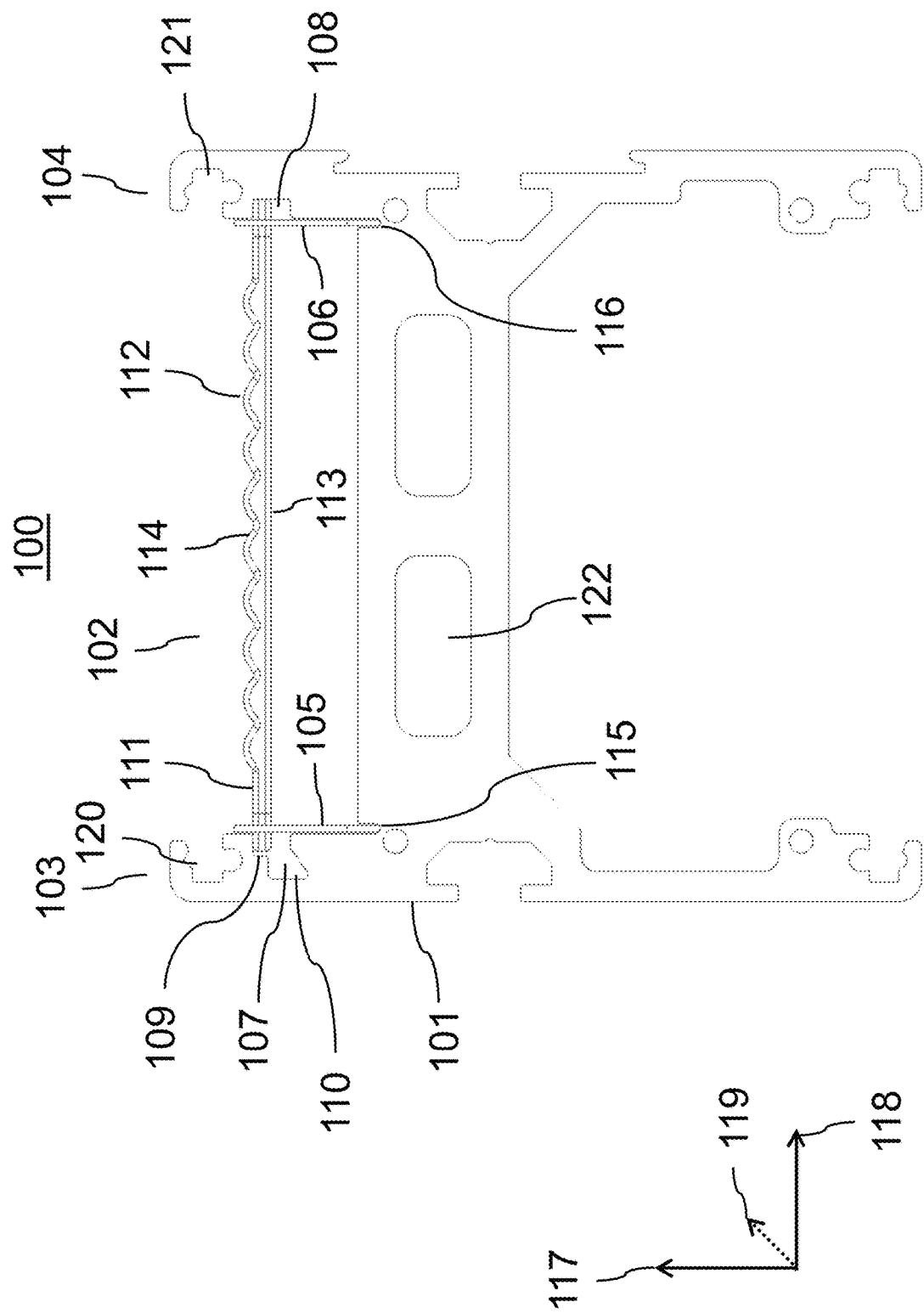
FIG. 1 shows a schematic cross-sectional illustration of a retention apparatus according to the invention.

FIG. 1 shows a schematic cross-sectional illustration of a retention apparatus 100 according to the invention. This retention apparatus 100 comprises a retention body 101, which delimits an inner region 102 on a first side 103 and a further side 104 opposite to the first side 103. The retention body 101 is a structural profile made of aluminum which is obtainable by means of an extrusion method and which forms a housing of a luminaire 600 (cf. FIG. 6). Further, the retention apparatus 100 comprises a multiplicity of spring elements, including a first spring element 105 and a further spring element 106 shown in FIG. 1. On the first side 103, the retention body 101 comprises a first receiving portion 107, which faces the inner region 102 and which is embodied as a first groove 107. On the further side 104, the retention body 101 comprises a second receiving portion 108, which faces the inner region 102 and which is embodied as a second groove 108. Further, an optical module 111 in a retention state can be seen in FIG. 1. This optical module 111 has a light input side 113 and a light output side 114. Further, the optical module 111 extends in a planar fashion in a module plane (which is horizontal and extending into the plane of the figure in this figure) and consists of quartz glass. The optical module 111 comprises a multiplicity of optical units 112, more precisely lenses 112, which are embodied as planoconvex converging lenses in this case. These lenses 112 define the light input side 113 and the light output side 114. A first direction 117 is defined in this case by virtue of extending from the light input side 113 to the light output side 114. The first direction 117 is directed vertically upward in the figure. A second direction 118 is defined by virtue of extending from the first side 103 to the further side 104. The second direction 118 is directed horizontally from left to right in the figure. A third direction 119 is perpendicular to the first direction 117 and the second direction 118 in a right-handed orthogonal system. Thus, the third direction 119 is directed into the plane of the figure.

Figure 5:
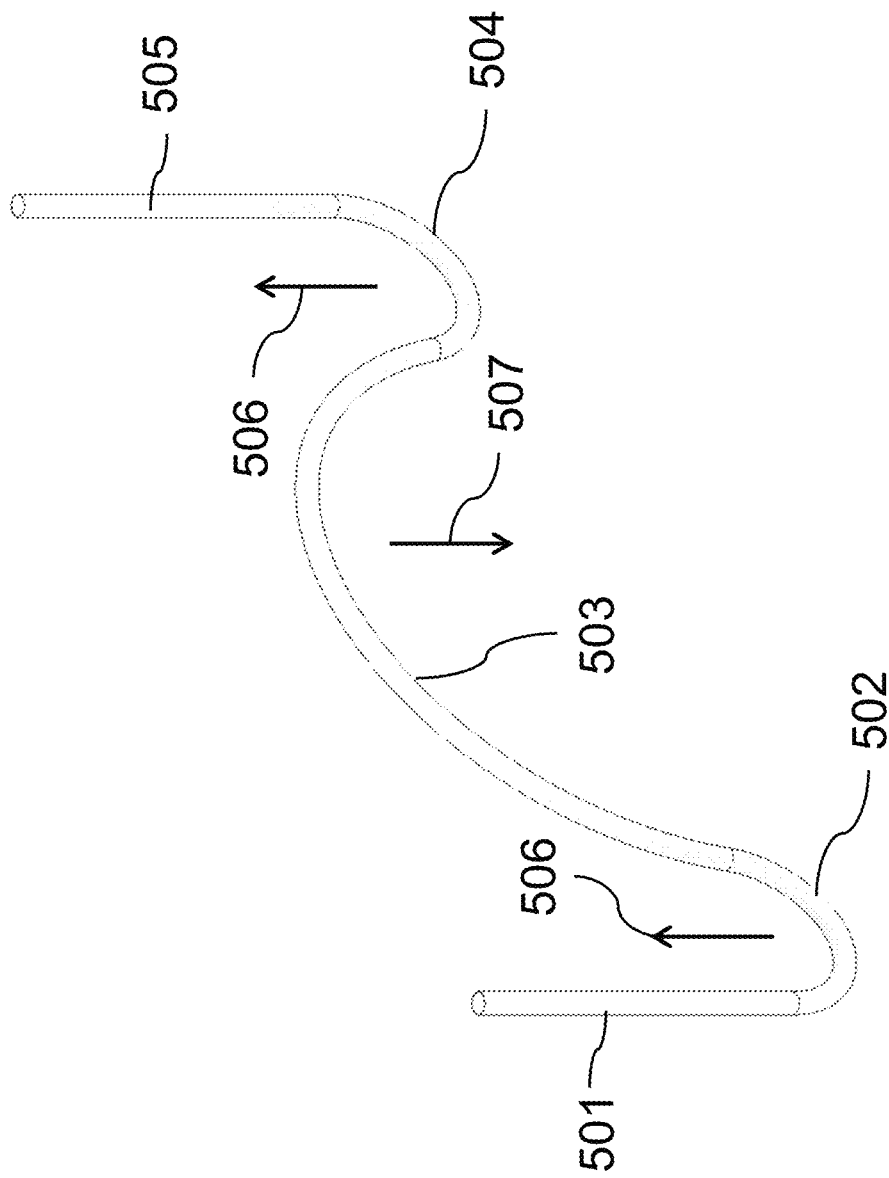
FIG. 5 shows a schematic perspective illustration of one of the spring elements of the retention apparatus of FIG. 1.

Now, the retention apparatus 100 is embodied to retain the shown optical module 111 in the retention state by means of the first receiving portion 107, the second receiving portion 108, the first spring element 105 and the further spring element 106, in such a way that the optical module 111 in the retained state is held in the first direction 117 by means of an interlock between the optical module 111 and the first receiving portion 107 and between the optical module 111 and the second receiving portion 108 and held counter to the first direction 117 by means of a spring force directed against the optical module 111 of the first spring element 105 and the further spring element 106. Additionally, the optical module 111 in the retained state is held in the second direction 118 by means of an interlock between the optical module 111 and the second receiving portion 108 and held counter to the second direction 118 by means of an interlock between the optical module 111 and the first receiving portion 107. To this end, edge regions of the optical module 111 on the first side 103 and the further side 104 are seated in the first groove 107 and in the second groove 108. Further, the first spring element 105 presses with its spring force against the optical module 111 from below on the first side 103 and the further spring element 106 presses with its spring force against the optical module 111 from below on the further side 104. In this case, the first spring element 105 is received in a third receiving portion 115, which is a third groove 115 in the retention body 101, and the further spring element 106 is received in a fourth receiving portion 116, which is a fourth groove 116 in the retention body 101. As a result of the shape of the first and the further spring elements 105, 106, which is shown in FIG. 5, these additionally fix the optical module 111 in the third direction 119.

While the second groove 108 has a simple rectangular cross section, the first groove 107 comprises a retention region 109 and an assembly region 110. In this case, a depth of the first groove 107 in the assembly region 110 is greater than in the retention region 109. Consequently, the optical module 111 can be pressed downward on the first side 103 counter to the spring force of the first spring element 105 and can thus be moved counter to the first direction 117 in order to transfer the optical module 111 from the retention region 109 to the assembly region 110 of the first groove 107. As a result, the optical module 111 is transferred from the retained state into an assembly state. The latter can be seen in FIGS. 3 and 4. As a result, the optical module 111 can initially be removed from the second groove 108 and then also from the first groove 107, and thus be removed from the retention apparatus 100. Thus, the removal of the optical module 111 is very simple, in particular does not require tools and can be carried out without unscrewing screws, and is possible from the user side (at the top in the figure). If now a multiplicity of optical modules 111 that are analogous to the optical module 111 shown in FIG. 1 are retained in the retention apparatus 100 by means of further spring elements (cf. FIG. 2), these optical modules 111 can be arranged in succession and with very little spacing from one another in the third direction 119. This does not only save space but also permits a comparatively very homogeneous spatial intensity profile of a luminaire 600 that has been equipped with the retention apparatus 100, and hence a homogeneous illumination of an object to be irradiated by the luminaire 600. Consequently, it is possible, for example, to homogeneously cure varnishes that have been applied over a large area, increasing the quality of the varnish layer obtained. Printing inks printed over a large area can also be cured homogeneously, increasing the productivity of a printing machine 801 (cf. FIG. 8).

Further, the optical module 111 is always retained in the retention apparatus 100 by forces defined by the first spring element 105 and the further spring element 106. Unlike in the case of the retention apparatus 1000 shown in FIG. 11, an excessive force outlay on account of screws screwed in too tightly and damage to the optical module 111 resulting therefrom cannot arise. Unlike in the retention apparatus shown in FIG. 10, the optical module 111 cannot inadvertently fall into the housing of the luminaire 600, not even during the assembly, in the case of the retention apparatus 100 according to the invention. Consequently, the retention apparatus 100 according to the invention reduces the risk of damage to the optical module 111 and also to the elements situated therebelow in the luminaire 600, in particular the light source 704 with a possible primary optical unit.

The retention body 101 of the retention apparatus 100 shown in FIG. 1 further comprises an additional groove 120 on the first side 103 and a second additional groove 121 on the further side 104. An optical window (not illustrated) can be inserted into these additional grooves 120, 121 along the third direction 119, said optical window protecting the inner region 102 from external influences such as dust. Further, the retention body 101 comprises cooling channels 122 for supplying and removing a cooling liquid, which can cool the light source 704 (cf. FIG. 7) of the luminaire 600, comprising the retention apparatus 100, during the operation thereof.

Figure 2:
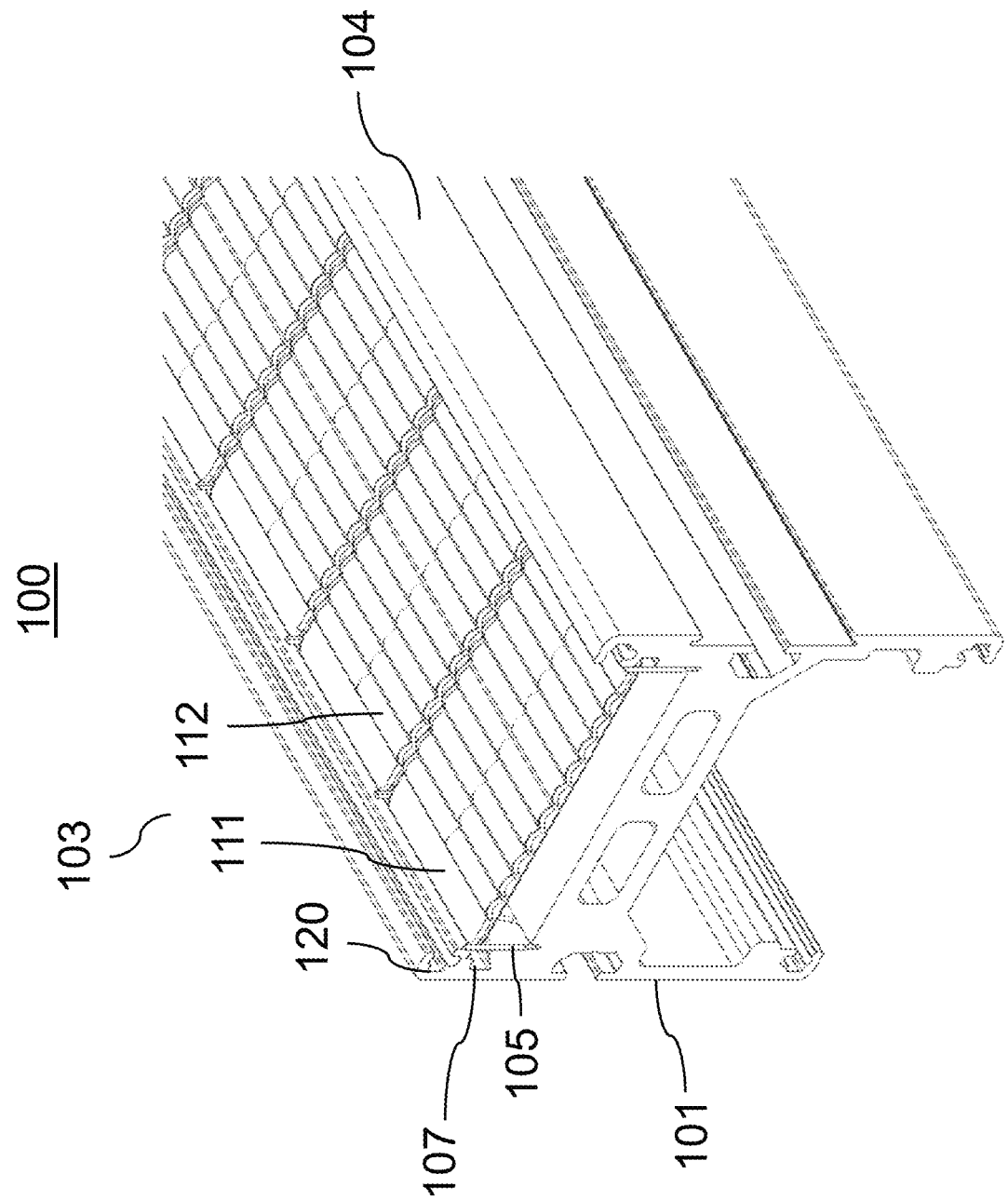
FIG. 2 shows a schematic perspective illustration of the retention apparatus according to the invention of FIG. 1.

FIG. 2 shows a schematic perspective illustration of the retention apparatus 100 according to the invention of FIG. 1. A multiplicity of optical modules 111 can be seen here, said optical modules being retained in the retained state in the retention apparatus 100. Ends of the spring elements arranged next to one another are situated between two optical modules 111 in each case. As a result, the optical modules 111 are also fixated in the third direction.

Figure 3:
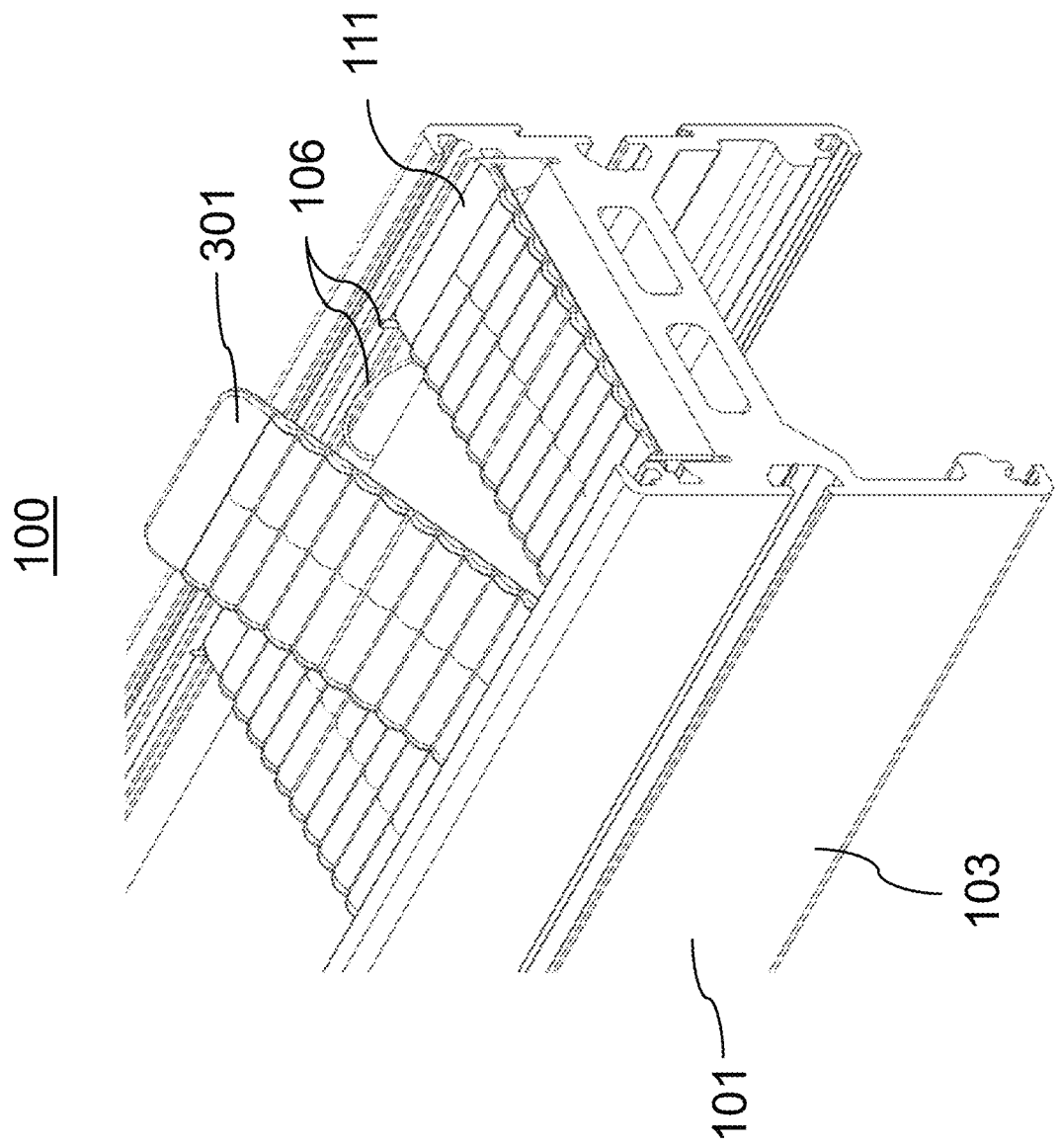
FIG. 3 shows a further schematic perspective illustration of the retention apparatus according to the invention of FIG. 1.

FIG. 3 shows a further schematic perspective illustration of the retention apparatus 100 according to the invention of FIG. 1. This shows an optical module 301 in the assembly state. On the first side 103, this optical module 301 has been transferred into the assembly region 110 of the first groove 107, as a result of which it could be removed from the second groove 108. As a result, the further spring element 106 can easily be identified here.

Figure 4:
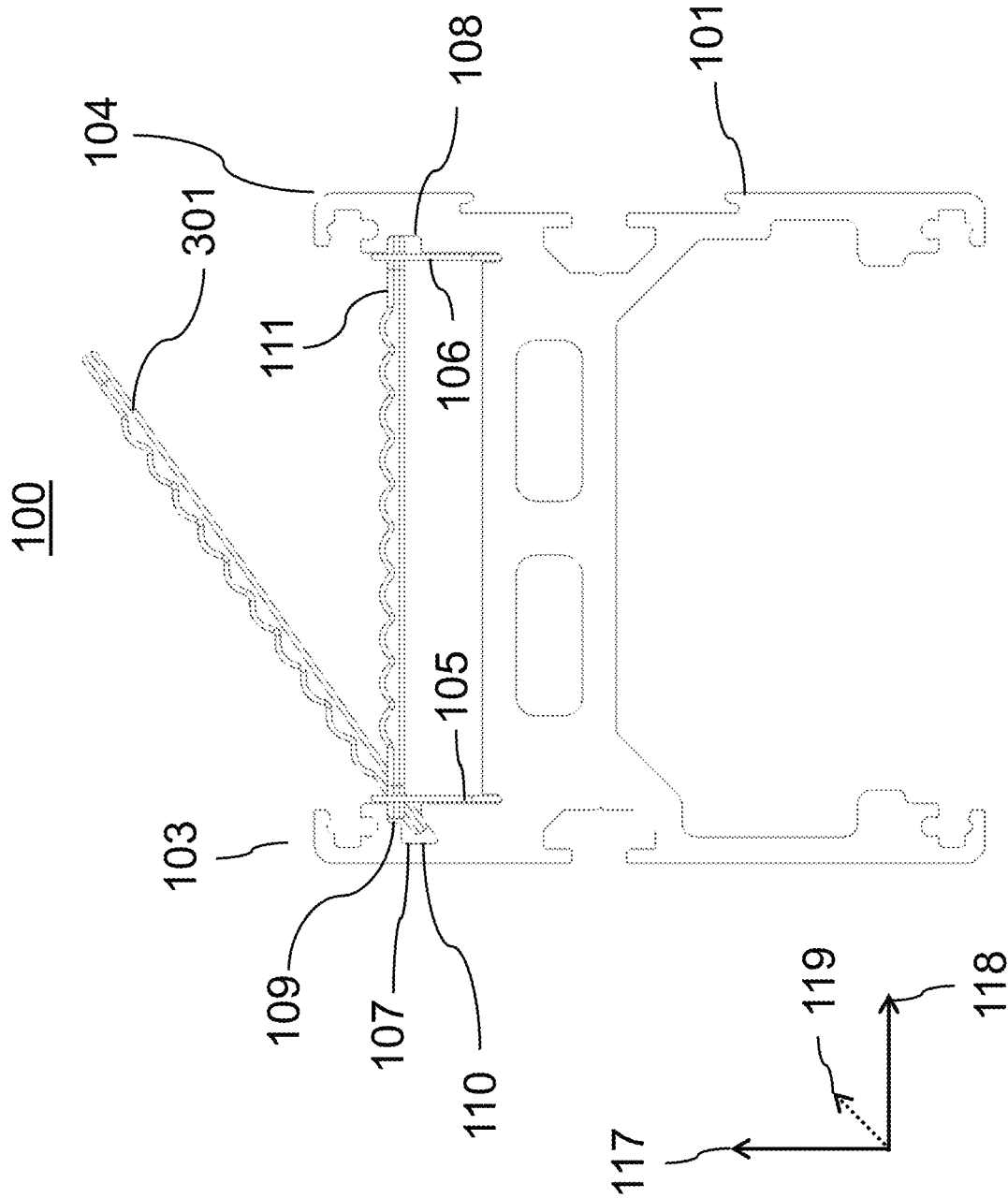
FIG. 4 shows a further schematic cross-sectional illustration of the retention apparatus according to the invention of FIG. 1.

FIG. 4 shows a further schematic cross-sectional illustration of the retention apparatus 100 according to the invention of FIG. 1. In contrast to FIG. 1, two optical modules 111, 301 arranged in succession in the third direction 119 can be seen here. The back optical module 301 is in the assembly state while the front optical module 111 is in the retained state.

FIG. 5 shows a schematic perspective illustration of one of the spring elements 105, 106 of the retention apparatus 100 of FIG. 1. All spring elements retaining the optical modules 111 in the retention apparatus 100 are embodied as shown in FIG. 5. Accordingly, these are bending springs, more precisely wire springs. Each of these bending springs is elongate and has, in this sequence, a first end 501, a first section 502, a second section 503, a third section 504, and a further end 505 along its direction of longitudinal extent. The first end 501 and the further end 505 have a straight embodiment. In the first section 502, the bending spring has a first bend in a first bending direction 506. In the second section 503, the bending spring has a second bend in a further bending direction 507 counter to the first bending direction 506. In the third section 504, the bending spring once again has a third bend in the first bending direction 506. As a result, the bending spring approximately has the shape of one and of half an "S". The first to third bend 502 to 504 allow the bending spring to be tensioned counter to the first direction 117 and in the third direction 119 in the retained state. As a result, the bending spring can exert a spring force on an optical module 111 in the first direction 117 and thus retain this optical module 111 counter to the first direction 117. In combination with the straight ends 501, 505, the above-described tension of the bending springs moreover facilitates a fixation of the optical modules in the third direction 119. Further, a spatial requirement of each bending spring is very small in the second direction 118, as a result of which these cover the retained optical module 11 as little as possible. Consequently, the bending spring also covers the smallest possible portion of an emission surface of the luminaire 600 with the retention apparatus 100.

Figure 6:
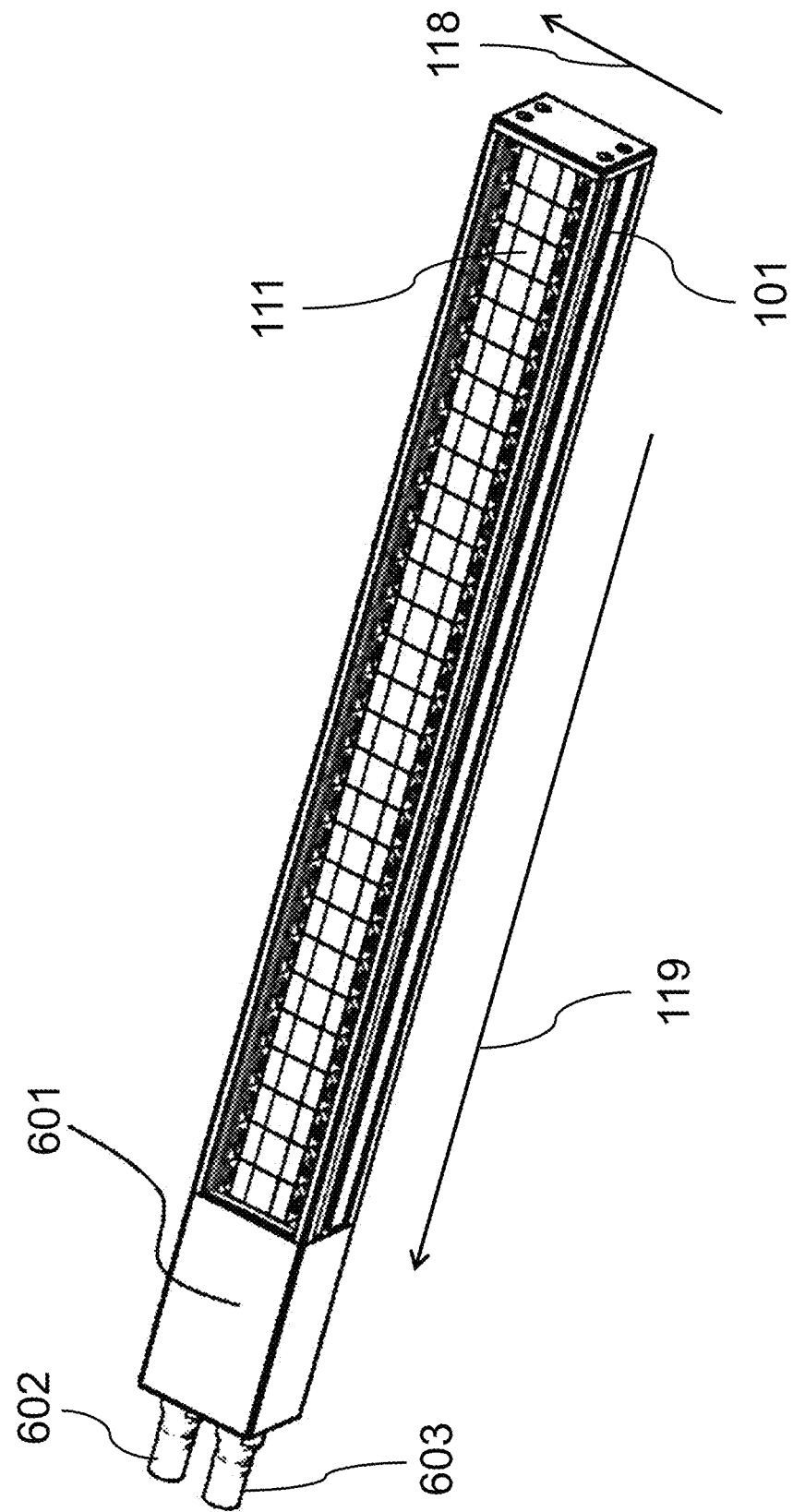
FIG. 6 shows a schematic perspective illustration of a luminaire according to the invention.

FIG. 6 shows a schematic perspective illustration of a luminaire 600 according to the invention. The luminaire 600 comprises light sources 704 (see FIG. 7), the retention apparatus 100 of FIG. 1, and a multiplicity of optical modules 111 in the retention state. The optical modules 111 are each arranged downstream of one of the light sources 704 in the first direction 117 (cf. FIG. 1) and at a distance therefrom, as a result of which the light sources 704 are hidden in FIG. 6. The lenses 112 of the optical modules 111 are secondary optical units of the light sources 704 in this case. As already mentioned in relation to FIG. 1, the retention body 101 of the retention apparatus 100 forms a housing of the luminaire 600. Further, the luminaire 600 comprises a connector 602 for a cooling fluid supply and a connector 603 for a cooling fluid return of a coolant circuit. The connectors 602 and 603 are connected to the cooling channels 122 of the retention body 101 by means of a connecting element 601.

Figure 7:
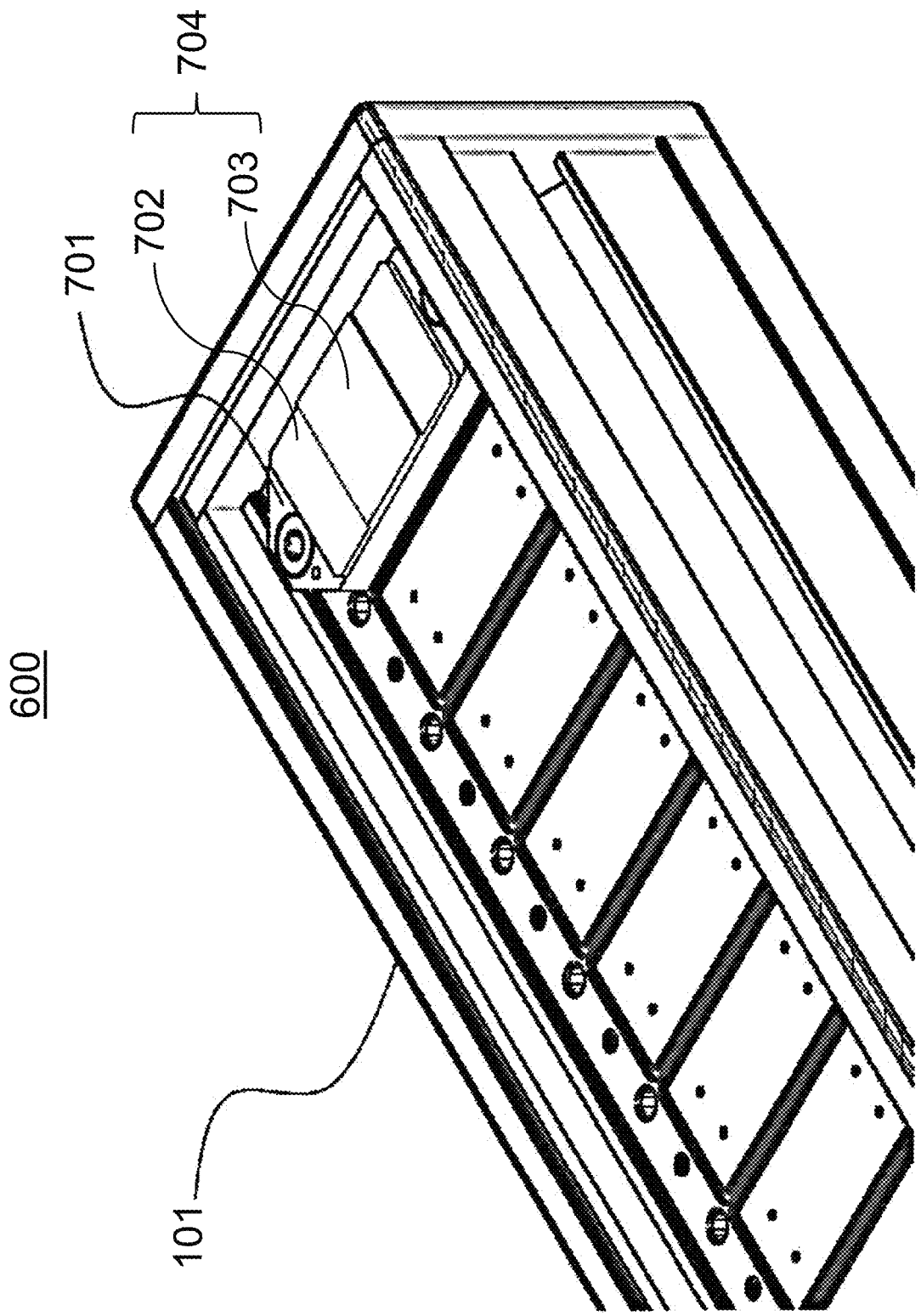
FIG. 7 shows a schematic partial view of the luminaire according to the invention of FIG. 6.

The luminaire 600 is a UV emitter, which becomes evident from the description of the light sources 704 in relation to FIG. 7.

FIG. 7 shows a schematic partial view of the luminaire 600 according to the invention of FIG. 6. In this case, the optical modules 111 have not been illustrated, freeing up the view of the elements situated therebelow. Only one of the light sources 704 is shown here. This light source 704 is a UV LED, comprising a plurality of semiconductor chips 703 that are arranged on a printed circuit board 702 using chip-on-board technology. The light source 704 is arranged on a carrier 701, which is connected by means of screws to the retention body 101. Since each UV LED is arranged individually on such a carrier 701, the light sources 704 are removable on an individual basis.

Figure 8:
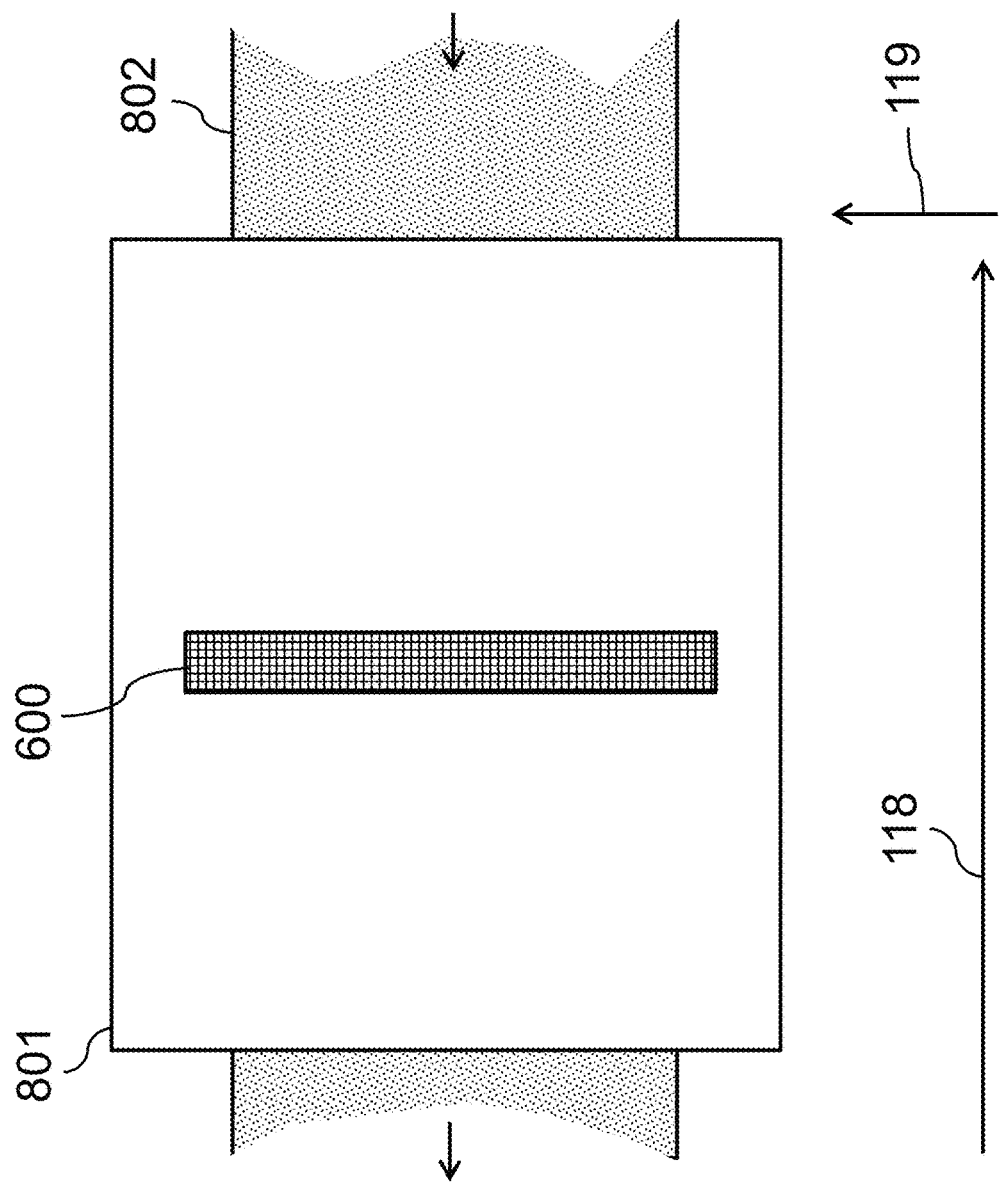
FIG. 8 shows a schematic illustration of a printing machine according to the invention.

FIG. 8 shows a schematic illustration of a printing machine 801 according to the invention, comprising the luminaire 600 of FIG. 6. Printing ink can be printed onto a printing substrate 802 by means of the printing machine 801, it being possible to subsequently cure said printing ink by irradiation using a UV light from the luminaire 600. The printing machine 801 is a sheet-fed offset printing machine.

Figure 9:
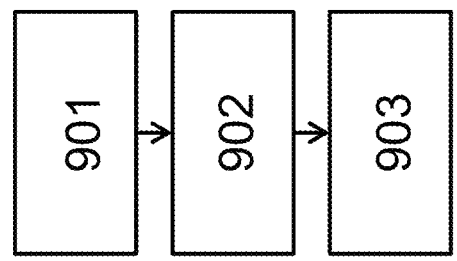
FIG. 9 shows a flowchart of a method according to the invention.

FIG. 9 shows a flowchart of a method 900 according to the invention. In a method step a) 901, the printing machine 801 of FIG. 8 and, as an object to be irradiated, the printing substrate shown in FIG. 8 are provided. In a step 902, the printing substrate is printed on with printing ink by means of the printing machine 801. In a method step b) 903, the applied printing ink is cured by irradiation using UV light from the luminaire 600 and a printed product is thus obtained.

FIG. 10 shows a schematic cross-sectional illustration of a non-inventive retention apparatus 1000. In this case, an optical module 111 with light input side 113 and light output side 114 is retained on a first side 103 and a further side 104 by means of clamps 1002 clamped into grooves 101. In this case, the clamps 1002 are tensioned in the second direction 118 extending from the first side 103 to the further side 104, but not tensioned in a first direction 117 extending from the light input side 113 to the light output side 114. As a result, the clamps 1002 do not exert any spring force on the module 111 in the first direction 117 and counter thereto. As a result, the retention state can be released if one of the clamps 1002 slips out of the respective groove 1001. In particular, this can happen if there is external pressure on the optical module 111 counter to the first direction 117. Moreover, the retention state of the optical module 111 can only be released from the user side (light output side 114) in this manner, which comprises a significant risk of damage to the optical module 111 and elements located therebelow. Alternatively, the housing of the luminaire comprising this retention apparatus 1000 must be opened and the optical module 111 must be released from below. This is substantially more cumbersome than the above-described removal of an optical element 111 from the retention apparatus 100 according to the invention.

FIG. 11 shows a schematic cross-sectional illustration of a further non-inventive retention apparatus 1100. In this case, the optical modules 111 with light input side 113 and light output side 114, which are arranged successively into the plane of the drawing, are retained in a retention state on a first side 103 and a further side 104, in each case by means of two clamping strips 1101. The two clamping strips are connected to one another by way of screws 1102. This retention apparatus 100 appears obvious but harbors a number of disadvantages. Should a single optical module 111 be defective and be intended to be replaced, it is necessary to release numerous screws 1102 in cumbersome fashion. As a result, all optical modules 111 held by the clamping strips 1101 are brought out of adjustment and must be readjusted with great outlay following the replacement of the single defective optical module 111. Further, the retention force exerted by the clamping strips 1102 on the optical modules 111 depends on how tightly the screws 1102 are screwed. If the retention force becomes too large, the optical modules 111 might be damaged. Further, released screws 1102 can fall down into the housing of the luminaire and might cause damage there or simply be lost. By contrast, the retention apparatus 100 according to the invention makes do without clamping strips 1102 and without screws 1102 for holding the optical modules 111. Further, each optical module 111 can be replaced individually, without bringing other optical modules 111 out of adjustment. Additionally, the retention apparatus 100 according to the invention requires less space in the first direction 117 and in the second direction 118. As a result, the luminaire can be positioned closer to the object to be irradiated. Moreover, a plurality of luminaires can be arranged tightly next to one another in the second direction 118. In the process, the optical modules 111 remain easily replaceable since the removal can be implemented from the user side alone.

LIST OF REFERENCE NUMBERS

100 Retention apparatus according to the invention
101 Retention body
102 Inner region
103 First side
104 Further side
105 First spring element
106 Further spring element
107 First receiving portion/first groove
108 Second receiving portion/second groove
109 Retention region
110 Assembly region
111 Optical module in the retention state
112 Optical unit/lens
113 Light input side
114 Light output side
115 Further receiving portion/further groove/third receiving portion/third groove
116 Further receiving portion/further groove/fourth receiving portion/fourth groove
117 First direction
118 Second direction
119 Third direction
120 Additional receiving portion/additional groove/first additional receiving portion/first additional groove
121 Additional receiving portion/additional groove/second additional receiving portion/second additional groove
122 Cooling channel
301 Optical module in the assembly state
501 First end
502 First section
503 Second section
504 Third section
505 Further end
506 First bending direction
507 Further bending direction
600 Luminaire according to the invention
601 Connecting element
602 Connector for cooling fluid supply
603 Connector for cooling fluid return
701 Carrier
702 Printed circuit board
703 Semiconductor chips
704 Light source/LED
801 Printing machine according to the invention
802 Substrate/printing substrate
900 Method according to the invention
901 Method step a)
902 Printing
903 Method step b)

1000 Non-inventive retention apparatus
1001 Groove
1002 Clamp
1100 Further non-inventive retention apparatus
1101 Clamping strip
1102 Screw

The invention claimed is:

1. A retention apparatus, comprising:
a) a retention body, which delimits an inner region at least on a first side and a further side opposite to the first side, and
b) at least one spring element;
wherein the retention body comprises, on the first side, a first receiving portion facing the inner region and, on the further side, a second receiving portion facing the inner region;
wherein the retention apparatus is embodied to retain at least one optical module, which has a light input side and an opposing light output side, by means of the first receiving portion, the second receiving portion, and the at least one spring element in a retention state, such that the at least one optical module in the retention state is retained
a. in a first direction extending from the light input side to the light output side by means of an interlock of
 i. the at least one optical module with the first receiving portion and
 ii. the at least one optical module with the second receiving portion, and
b. in an opposite direction to the first direction by means of a spring force of the at least one spring element directed against the at least one optical module;
wherein the first receiving portion comprises a retention region and an assembly region, and
wherein a depth of the first receiving portion in the assembly region is greater than in the retention region.

2. The retention apparatus as claimed in claim 1, wherein the at least one optical module in the retention state is further retained
c. in a second direction extending from the first side to the further side by means of an interlock between the at least one optical module and the second receiving portion, and
d. in an opposite direction to the second direction by means of an interlock between the at least one optical module and the first receiving portion.

3. The retention apparatus as claimed in claim 1, wherein the at least one spring element in the retention state is tensioned counter to the first direction and in a third direction perpendicular thereto.

4. The retention apparatus as claimed in claim 1, wherein the at least one spring element is at least one bending spring.

5. The retention apparatus as claimed in claim 4, wherein the at least one bending spring is elongated,
wherein the at least one bending spring comprises a first section, a second section, and a third section in this sequence along its longitudinal extent,
wherein the at least one bending spring comprises a first bend in a first bending direction in the first section, a second bend in a further bending direction, counter to the first bending direction, in the second section, and a third bend in the first bending direction in the third section.

6. The retention apparatus as claimed in claim 4, wherein a first end and a further end, opposite thereto, of the at least one bending spring are embodied in the retention state to retain the at least one optical module in a third direction, which is perpendicular to a second direction extending from the first side to the further side, and counter to said third direction.

7. A luminaire, comprising
A) at least one light source and
B) the retention apparatus as claimed in claim 1 and
C) the at least one optical module in the retention state,
wherein the at least one optical module is arranged downstream of the at least one light source in the first direction.

8. The luminaire as claimed in claim 7, wherein the luminaire is a UV emitter or an IR emitter.

9. A printing machine, comprising the luminaire as claimed in claim 7.

10. A method for producing a product, the method comprising the following as method steps:
a) providing
   i) the luminaire as claimed in claim 7 and
   ii) an object to be irradiated; and
b) irradiating the object to be irradiated with light emitted by the at least one light source, the product being obtained thereby.

11. A retention apparatus, comprising:
a) a retention body, which delimits an inner region at least on a first side and a further side opposite to the first side, and
b) at least one spring element;
wherein the retention body comprises, on the first side, a first receiving portion facing the inner region and, on the further side, a second receiving portion facing the inner region;
wherein the retention apparatus is embodied to retain at least one optical module, which has a light input side and an opposing light output side, by means of the first receiving portion, the second receiving portion, and the at least one spring element in a retention state, such that the at least one optical module in the retention state is retained
   a. in a first direction extending from the light input side to the light output side by means of an interlock of
      i. the at least one optical module with the first receiving portion and
      ii. the at least one optical module with the second receiving portion, and
   b. in an opposite direction to the first direction by means of a spring force of the at least one spring element directed against the at least one optical module;
   wherein the at least one spring element is at least one bending spring,
   wherein the at least one bending spring is elongated,
   wherein the at least one bending spring comprises a first section, a second section, and a third section in this sequence along its longitudinal extent, and
   wherein the at least one bending spring comprises a first bend in a first bending direction in the first section, a second bend in a further bending direction, counter to the first bending direction, in the second section, and a third bend in the first bending direction in the third section.

12. The retention apparatus as claimed in claim 11, wherein the at least one optical module in the retention state is further retained
   c. in a second direction extending from the first side to the further side by means of an interlock between the at least one optical module and the second receiving portion, and
   d. in an opposite direction to the second direction by means of an interlock between the at least one optical module and the first receiving portion.

13. The retention apparatus as claimed in claim 11, wherein the first receiving portion comprises a retention region and an assembly region, and
   wherein a depth of the first receiving portion in the assembly region is greater than in the retention region.

14. The retention apparatus as claimed in claim 11, wherein the at least one spring element in the retention state is tensioned counter to the first direction and in a third direction perpendicular thereto.

15. The retention apparatus as claimed in claim 11, wherein a first end and a further end, opposite thereto, of the at least one bending spring are embodied in the retention state to retain the at least one optical module in a third direction, which is perpendicular to a second direction extending from the first side to the further side, and counter to said third direction.

16. A luminaire, comprising
A) at least one light source and
B) the retention apparatus as claimed in claim 11 and
C) the at least one optical module in the retention state,
wherein the at least one optical module is arranged downstream of the at least one light source in the first direction.

17. The luminaire as claimed in claim 16, wherein the luminaire is a UV emitter or an IR emitter.

18. A printing machine, comprising the luminaire as claimed in claim 16.

19. A method for producing a product, the method comprising the following as method steps:
a) providing
   i) the luminaire as claimed in claim 16 and
   ii) an object to be irradiated; and
b) irradiating the object to be irradiated with light emitted by the at least one light source, the product being obtained thereby.

* * * * *